United States Patent
MacInnis et al.

(10) Patent No.: US 8,331,294 B2
(45) Date of Patent: Dec. 11, 2012

(54) METHOD AND SYSTEM FOR MANAGING INFORMATION AMONG PERSONALIZED AND SHARED RESOURCES WITH A PERSONALIZED PORTABLE DEVICE

(75) Inventors: Alexander MacInnis, Ann Arbor, MI (US); Jeyhan Karaoguz, Irvine, CA (US); Arya Behzad, Poway, CA (US); Thomas Quigley, Franklin, NC (US); John Stuart Walley, Ladera Ranch, CA (US); Mark Buer, Gilbert, AZ (US)

(73) Assignee: Broadcom Corporation, Irvine, CA (US)

( * ) Notice: Subject to any disclaimer, the term of this patent is extended or adjusted under 35 U.S.C. 154(b) by 885 days.

(21) Appl. No.: 11/864,184

(22) Filed: Sep. 28, 2007

(65) Prior Publication Data
US 2009/0022092 A1 Jan. 22, 2009

Related U.S. Application Data

(60) Provisional application No. 60/950,931, filed on Jul. 20, 2007.

(51) Int. Cl.
*H04W 4/00* (2009.01)
(52) U.S. Cl. ... 370/329; 370/331; 370/341; 370/395.52; 370/469; 455/414.1; 455/435.1; 455/466
(58) Field of Classification Search .................. 370/331, 370/338, 341, 349, 395.52, 469, 329; 455/414.1, 455/435.1, 466
See application file for complete search history.

(56) References Cited

U.S. PATENT DOCUMENTS

| 6,115,384 | A  | * | 9/2000  | Parzych        | 370/401  |
|-----------|----|---|---------|----------------|----------|
| 6,314,091 | B1 | * | 11/2001 | LaRowe et al.  | 370/338  |
| 6,766,165 | B2 | * | 7/2004  | Sharma et al.  | 455/423  |
| 6,795,688 | B1 | * | 9/2004  | Plasson et al. | 455/41.2 |

(Continued)

FOREIGN PATENT DOCUMENTS
EP 1450517 8/2004
(Continued)

OTHER PUBLICATIONS

Seagate Technology LLC, Seagate D.A.V.E. (Digital Audio Video Experience) Transform the consumer digital content experience with the Seagate D.A.V.E design concept, Data Sheet, 2007.

(Continued)

*Primary Examiner* — Ayaz Sheikh
*Assistant Examiner* — Andrew C Lee
(74) *Attorney, Agent, or Firm* — Thomas|Horstemeyer, LLP (57) ABSTRACT

A user's request via a portable or handheld wireless communication device (HWCD) to process data may result in discovery of one or more networked resources capable of handling the processing. One or more communication routes may be established between one or more discovered network resources and one or more of the HWCD and a networked terminating device. The portable HWCD may be configured as a gateway. The user's identity may be determined and the user's personal networking preferences may be acquired. Based user's preferences, a route may be established between discovered networked resources and one or more of the HWCD and the networked terminating device. The user's identity may be authenticated. Data may undergo rate and/or format conversion. The data may be protected by secure operations. One or more of the HWCD and the networked terminating device may consume or render the requested data.

30 Claims, 5 Drawing Sheets

U.S. PATENT DOCUMENTS

| | | | |
|---|---|---|---|
| 6,804,232 B1* | 10/2004 | Donaghey | 370/389 |
| 6,990,531 B2* | 1/2006 | Vange | 709/240 |
| 7,027,881 B2* | 4/2006 | Yumoto et al. | 700/65 |
| 7,039,027 B2* | 5/2006 | Bridgelall | 370/329 |
| 7,058,414 B1* | 6/2006 | Rofheart et al. | 455/456.4 |
| 7,203,486 B2 | 4/2007 | Patel | |
| 7,248,858 B2* | 7/2007 | Barber et al. | 455/414.1 |
| 7,363,349 B2* | 4/2008 | Friedman et al. | 709/217 |
| 7,366,523 B2* | 4/2008 | Viikari et al. | 455/456.1 |
| 7,418,472 B2* | 8/2008 | Shoemaker et al. | 709/203 |
| 7,418,736 B2* | 8/2008 | Ghanea-Hercock | 726/28 |
| 7,428,271 B2* | 9/2008 | Han et al. | 375/316 |
| 7,468,968 B2* | 12/2008 | Svensson et al. | 370/338 |
| 7,675,537 B2* | 3/2010 | Wilson et al. | 348/14.01 |
| 7,747,255 B2* | 6/2010 | Dacosta et al. | 455/452.2 |
| 7,809,386 B2* | 10/2010 | Stirbu | 455/503 |
| 7,826,408 B1* | 11/2010 | Vleugels et al. | 370/328 |
| 8,027,272 B2* | 9/2011 | Ramachandran et al. | 370/254 |
| 2002/0075301 A1* | 6/2002 | Basso et al. | 345/744 |
| 2002/0186676 A1 | 12/2002 | Milley et al. | |
| 2004/0158631 A1* | 8/2004 | Chang et al. | 709/224 |
| 2004/0193420 A1* | 9/2004 | Kennewick et al. | 704/257 |
| 2004/0210657 A1 | 10/2004 | Narayanan et al. | |
| 2005/0120380 A1* | 6/2005 | Wolfe | 725/100 |
| 2005/0138173 A1* | 6/2005 | Ha et al. | 709/225 |
| 2006/0087993 A1* | 4/2006 | Sengupta et al. | 370/310 |
| 2006/0176281 A1* | 8/2006 | Bennett et al. | 345/169 |
| 2007/0010261 A1* | 1/2007 | Dravida et al. | 455/456.3 |
| 2007/0047568 A1* | 3/2007 | Wang et al. | 370/429 |
| 2007/0109989 A1* | 5/2007 | Nakagawa et al. | 370/328 |
| 2007/0233879 A1* | 10/2007 | Woods et al. | 709/227 |
| 2007/0239991 A1 | 10/2007 | Cheng | |
| 2008/0046369 A1* | 2/2008 | Wood | 705/50 |
| 2008/0069105 A1* | 3/2008 | Costa et al. | 370/392 |
| 2008/0146206 A1* | 6/2008 | Pichardo et al. | 455/415 |
| 2009/0207252 A1 | 8/2009 | Raghunath | |
| 2009/0222576 A1* | 9/2009 | Elstermann et al. | 709/238 |

FOREIGN PATENT DOCUMENTS

| | | |
|---|---|---|
| KR | 2003-0069308 | 8/2003 |
| WO | WO2005/078676 A2 | 8/2005 |

OTHER PUBLICATIONS

Seagate Technology LLC, Seagate D.A.V.E. (Digital Audio Video Experience) The portable storage platform that collects, plays and manages digital content, Product Overview, 2007.

European Search Report corresponding to European Patent Application Serial No. 08012947.1-2413, dated Feb. 9, 2009.

DLNA (Digital Living Network Alliance): "DLNA Overview and Vision Whitepaper 2006." Internet citation, [Online] 2006, http://web.archive.org/web/20070411075214rn_1/www.dlna.org/en/industry/about/dlna_white_paper_2006/pdf.

Brown, et al., "A SIP-based OSGi device communication service for mobile personal area networks." Consumer Communications and Networking Conference, 2006.

Yeon-Joo, et al., "Design of an Extended Architecture for Sharing DLNA Compliant Home Media from Outside the Home." IEEE Transactions on Consumer Electronics, vol. 53, No. 2, May 1, 2007.

* cited by examiner

METHOD AND SYSTEM FOR MANAGING INFORMATION AMONG PERSONALIZED AND SHARED RESOURCES WITH A PERSONALIZED PORTABLE DEVICE

CROSS-REFERENCE TO RELATED APPLICATIONS/INCORPORATION BY REFERENCE

This application makes reference to and claims priority to U.S. Provisional Application Ser. No. 60/950,931, filed on Jul. 20, 2007, entitled "Method and System for Managing Information Among Personalized And Shared Resources With A Personalized Portable Device."

FIELD OF THE INVENTION

Certain embodiments of the invention relate to information communication. More specifically, certain embodiments of the invention relate to a method and system for managing information among personalized and shared resources with a portable personalized device.

BACKGROUND OF THE INVENTION

The field of wireless communication has seen dramatic growth the last few years. In today's world, most people use their portable devices, be it cellular phones, PDA's, laptops, media players and/or other devices, for various purposes, business and personal, on a constant and daily basis. Increasingly, people are able to access information according to their individual choice. For instance people may select music or videos from an electronic media store of their choice and play them on portable devices. In addition, the Internet allows people to access news and information at a time convenient for them rather than at specified broadcast times. In addition, many wireless solutions have been introduced, and have made tremendous strides into everyday life.

For example, the use of Wireless Personal Area Networks (WPAN) has been gaining popularity in a great number of applications because of the flexibility and convenience in connectivity they provide. WPAN systems generally replace cumbersome cabling and/or wiring used to connect peripheral devices and/or mobile terminals by providing short distance wireless links that allow connectivity within very narrow spatial limits (typically, a 10-meter range). WPAN may be based on standardized technologies, for example Class 3 Bluetooth (BT) technology. While WPAN may be very beneficial for certain applications, other applications may require larger service areas and/or capabilities.

To satisfy such needs, other technologies have been developed to provide greater wireless service. Wireless Local Area Networks (WLAN) systems may operate within a 100-meter range, for example. In contrast to the WPAN systems, WLANs provide connectivity to devices that are located within a slightly larger geographical area, such as the area covered by a building or a campus, for example. WLAN systems are generally based on specific standards, for example IEEE 803.11 standard specifications, and typically operate within a 100-meter range, and are generally utilized to supplement the communication capacity provided by traditional wired Local Area Networks (LANs) installed in the same geographic area as the WLAN system.

Other wireless solutions have evolved from traditional land-based communication technologies. For instance, cellular phones have become just about an absolute necessity in today's world. While cellular technology was merely intended to add an element of mobility to the traditional telephony service, this technology has grown beyond that initial purpose. Many modern cellular technologies, including such technologies as GSM/GPRS, UMTS, and CDMA3000 may incorporate substantial data capabilities. Most of today's cellular services may include such features as text messaging, video streaming, web browsing . . . etc.

Some mobile devices have the capability to utilize one or more wireless technologies. For instance, WLAN systems may be operated in conjunction with WPAN systems to provide users with an enhanced overall functionality. For example, Bluetooth technology may be utilized to connect a laptop computer or a handheld wireless terminal to a peripheral device, such as a keyboard, mouse, headphone, and/or printer, while the laptop computer or the handheld wireless terminal may also be connected to a campus-wide WLAN network through an access point (AP) located within the building. Also, cellular technology may allow use of the mobile phone as a form of wireless modem that allows connecting a laptop, for example, to the internet via a cellular network.

In short, wireless networks may exist to support handheld wireless communication devices (HWCDs). However, while HWCDs have continued to grow in complexity and capability, these HWCDs still continue to suffer from some major limitations, especially physical limitations and power.

Just as with other electronic devices, the HWCDs have seen substantial growth in performance capability and speed. As such, they are finding applications in areas not predicted when first introduced to give users mobile telephony. They may comprise mini computers, multimedia players, GPS devices and many other applications, for example. As a result of the growth in performance, more and more applications are being added to wireless devices, thereby increasing complexity.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for managing information among personalized and shared resources with a personalized portable device, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for managing information among personalized and shared resources with a personalized portable device. Various embodiments of the invention may utilize a portable or handheld wireless communication device (HWCD) for configuring one or more connections to use local and/or remote resources for communicating and processing information. A user may make requests for processing of information via an HWCD. In this regard, the HWCD may discover available networks and resources and establish a route between one or more of the HWCD, a networked terminating device and resources selected according to a user's preferences. Once the route has been established, information may be communicated between the HWCD and the selected one or more of the available resources. The information may be processed to enable compatibility between various data formats and processing capabilities of target resources. The information may be made secure prior to transmission by the HWCD. The HWCD and/or a corresponding user may be authenticated. The handheld wireless communication device may communicate utilizing a plurality of wireless protocols.

Figure 1A:
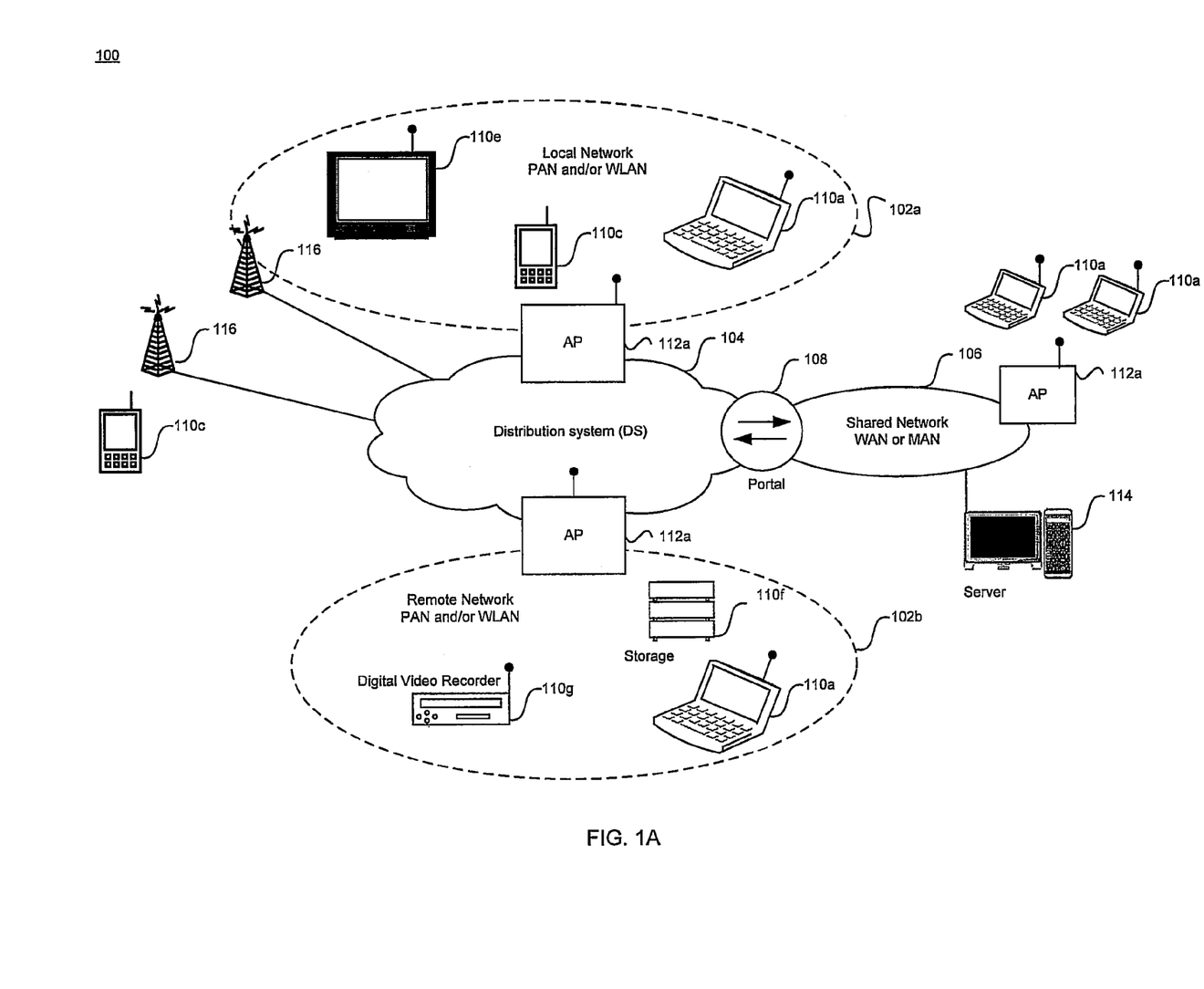
FIG. 1A is a block diagram of an exemplary WLAN infrastructure network comprising basic service sets (BSSs) integrated using a common distribution system (DS), in accordance with an embodiment of the invention.

FIG. 1A is a block diagram of exemplary network infrastructure that may be utilized for managing information among personalized and shared resources, in accordance with an embodiment of the invention. Referring to FIG. 1A, the exemplary network infrastructure 100 shown may comprise a local network 102a, a home network 102b, a shared network 106, a general purpose or special purpose processing device 110a, an HDTV monitor 110e, a portable or handheld wireless communication device (HWCD) 110c, access points (AP) 112a, a server 114, a portal 108, base stations 116, a digital video recorder 110g, a storage device 110f and a distribution system 104.

The local network 102a may comprise a plurality of electronic resources and network links available for access by a portable or handheld wireless communication device (HWCD) 110c. The HWCD 110c may comprise suitable hardware, logic, circuitry and/or code that may enable performing wireless mobile communication. For example, HWCD 102 may be utilized to perform voice and data communication. The HWCD 110c may also comprise suitable hardware, logic, circuitry and/or code that may enable performing additional functionality comprising Internet browsing and video or audio streaming. In addition, the HWCD 110c may enable communication within a plurality of wireless network technologies. For example the HWCD 110c may support links to entities within a personal area network (PAN) such as one or more devices enabled to render content or perform processing operations located within a short range from the HWCD 110c. The general purpose or special purpose processing device 110a may comprise suitable logic, circuitry or code to communicate with the HWCD 110c directly or via an access point (AP) 112a and process or render information.

A HDTV monitor 110e or other suitable devices may be enabled to terminate a connection and render content. In another example, the HWCD 110c may support links to a wireless local area network (WLAN) via an AP such as AP 112a which may provide links to the devices 110a and/or 110e, for example. The HWCD 110c may also be enabled to communicate greater distances via a cellular network or satellite network. The base station 116 may communicate with the HWCD 110c via one or more of a plurality of wireless technologies. The invention is not limited to the specific resources and network links shown in FIG. 1A and may comprise any suitable electronic resource and/or wireless communication technology.

The remote network 102b may comprise suitable logic, circuitry and/or code that may be enabled to communicate with the HWCD 110c. The invention may not be limited to the specific remote devices shown, but may comprise one or more devices that may be enabled to perform various jobs and/or tasks that may be requested by the HWCD 110c. For example, a general or special purpose processing device 110a, a storage unit 110f and a digital video recorder 110g may be linked to an AP 112a. For example, the remote network 102b may comprise a home PC that may be enabled to perform fast processing operations due to fast processing subsystems and increased memory space. Such a home PC may be better suited to perform processing and/or storage intensive tasks than devices within the local network 102a or the HWCD 110c. For example, devices within the remote network 102b may be utilized to perform processing of data and/or retrieval of data stored within device 110f for example.

The shared network 106 may comprise a wide area network (WAN) extending beyond geographic boundaries or a metropolitan area network (MAN) for example. The shared network 106 may comprise public access networks such as the internet and/or private or subscribed networks. The shared network 106 may comprise processing and storage facilities and may provide services for users. For example, the server 114 may support an electronic media store. In another example, the AP 112a may link users to information processed by general or special processors 110a.

The HWCD 110c may for example be a mobile phone which may access the remote network 102b and/or the shared network 106 via a base station 116. In addition the HWCD 110c may be located within range of a WLAN or PAN and access the remote 102b or shared 106 networks via shorter range links.

The distribution system 104 may comprise a plurality of interconnecting networks and suitable hardware, logic, circuitry and/or code that may be enabled to facilitate end-to-end communication between the HWCD 110c, the local network 102a, the remote network 102b and the shared network 106. The shared network 106 may comprise wireless and/or wired networks that may be enabled to communicate and forward messaging and/or data between the HWCD 110c and one or more of the remote network 102b and the shared network 106. The distribution system 104 may be utilized to provide a transport and/or switching fabric that may facilitate communication between the HWCD 110c and one or more of the remote network 102b and the shared network 106.

In operation, a user may be located within range of a local network 102a device for example. The user may request via an HWCD 110c, a transfer of data from one or more devices located in a remote network 102b and/or a shared network 106. The user and/or the HWCD 110c may be authenticated. The data may be processed for security, format compatibility and/or rate compatibility by a remote device, for example processor 110a. The data may be transferred via the distribution system 104 to a locally networked monitor 110e for example, and rendered there under control of the HWCD 110c.

Figure 1B:
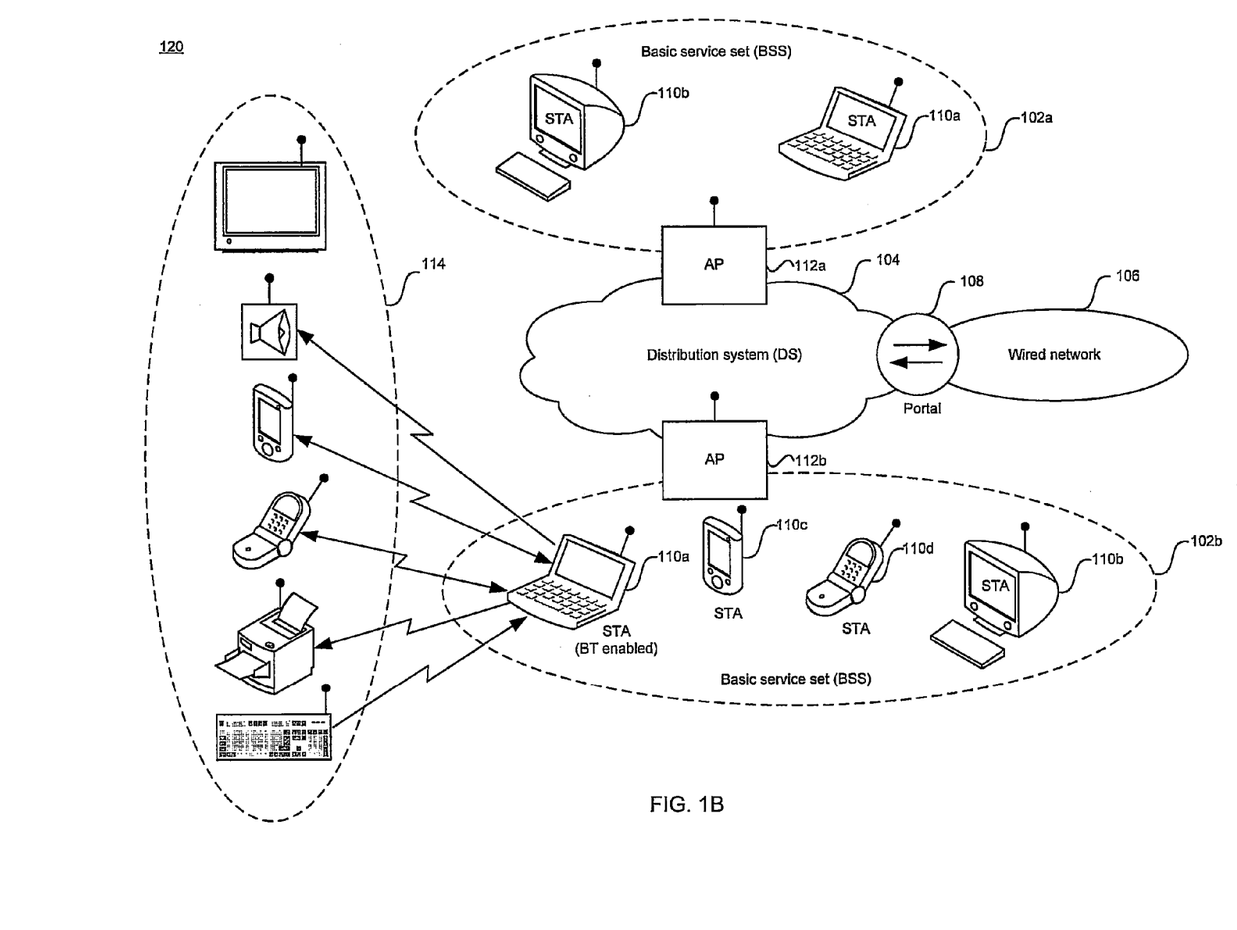
FIG. 1B is a block diagram of an exemplary WLAN infrastructure network comprising a basic service set (BSS) with stations that support WLAN/Bluetooth coexistence, in accordance with an embodiment of the invention.

FIG. 1B is a block diagram of an exemplary WLAN infrastructure network comprising at least one basic service set (BSS) with stations that support WLAN/Bluetooth coexistence, in connection with an embodiment of the invention. Referring to FIG. 1B, the exemplary WLAN infrastructure network 120 may comprise a BSS 102a that may comprise a laptop computer 110a and a personal computer 110b for example. In addition, a second BSS 102b may comprise mobile terminals or stations (STA) such as a Personal Digital Assistant (PDA) 110c and a mobile phone 110d as well as a personal computer 110b and a laptop computer 110a that is shown to be Bluetooth-enabled. The peripheral devices shown in block 114 may be part of the Wireless Personal Area Network (WPAN) supported by the Bluetooth-enabled laptop computer 110a. For example, the laptop computer 110a may communicate via Bluetooth technology with a video display, a keyboard, a mouse, a printer, a mobile phone, a PDA, and/or a set of headphones or speakers, where these devices and the laptop computer 110a may form an ad-hoc Bluetooth piconet. Generally, a Bluetooth piconet may comprise a master device or terminal and up to seven slave devices or terminals. In this exemplary implementation, the laptop computer 110a may correspond to the master Bluetooth terminal and the peripheral devices 114 may correspond to the slave Bluetooth terminals.

The Bluetooth-enabled laptop computer 110a in FIG. 1B may comprise a WLAN radio device and a Bluetooth radio device that allows it to communicate with the WLAN infrastructure network 120 via the AP 112b and with the Bluetooth piconet respectively.

A HWCD user may wish to utilize home-based resources while within an area with multiple wireless networks and protocols, or may wish to access devices utilizing other wireless protocols within the same area. The establishment of such a connection utilizing a single HWCD may require a dynamic routing capability, multi-protocol capability and built-in knowledge of user preferences and access privileges.

Figure 2A:
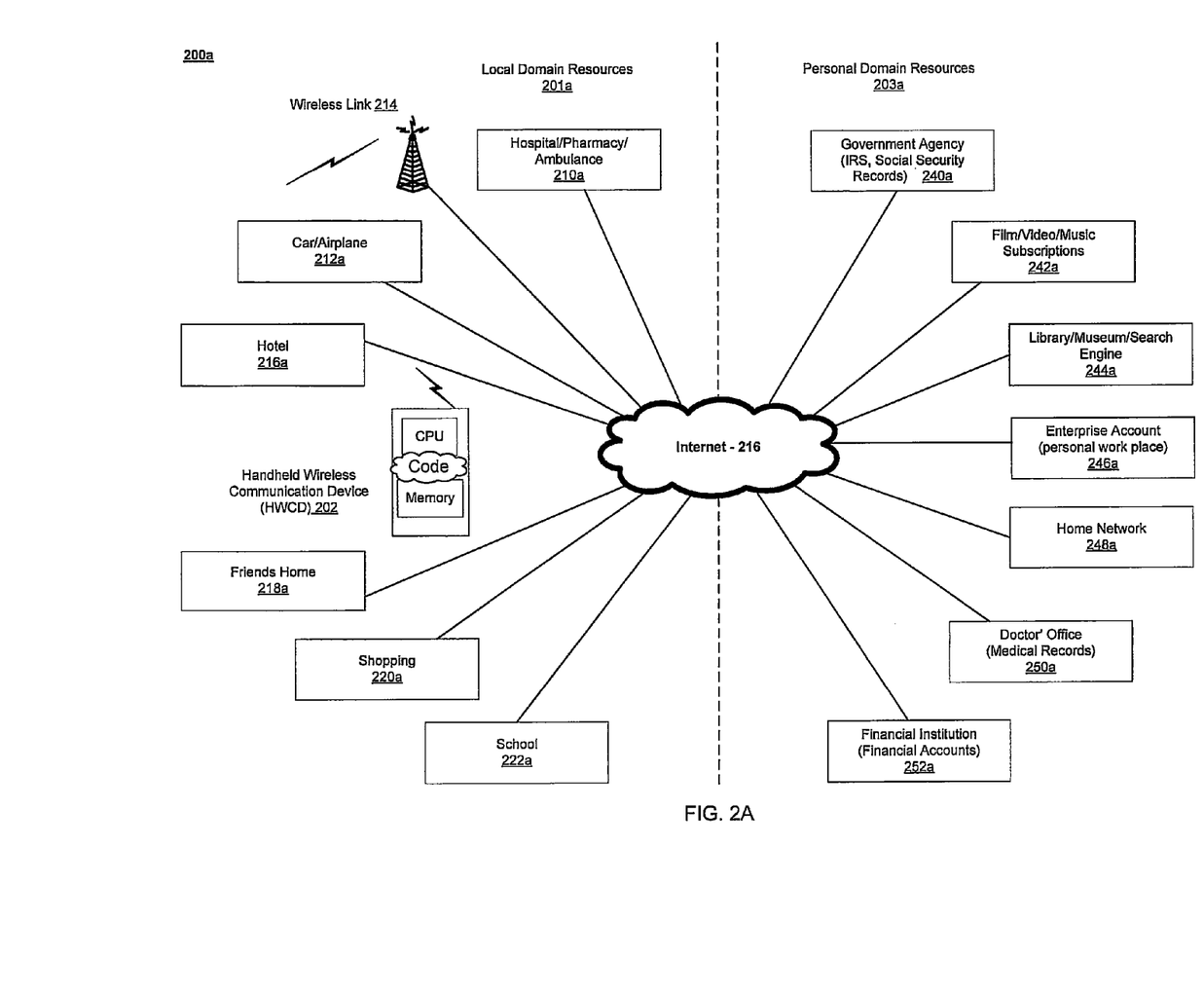
FIG. 2A is a block diagram that illustrates another embodiment of an exemplary usage model for coexistence of a terminal within a plurality of local and remote resources, in accordance with an embodiment of the invention.

FIG. 2A is a block diagram illustrating a personalized handheld communication device enabled to configure a personal virtual network comprising personalized and shared resources to communicate and manage information, in accordance with an embodiment of the invention. Referring to FIG. 2A, there is shown a plurality of wired and wireless networks 200a, a local domain 201a and a personal domain 203a. In addition, a connecting network 216 is shown.

The local domain 201a may comprise a personalized handheld wireless communication device (HWCD) 202, one or more wireless links 214, a hospital, pharmacy and or ambulance location 210a, a car or airplane 212a, a hotel 216a, a user's friends home 218a, a shopping center 220a and a school 222a. These resources may become available to a user on an ad hoc basis as the user travels from one location to another and may serve as an extension of a user's personal network.

The personal domain 203a may comprise government agencies 240a, subscribed film/video/music service 242a, a library, museum or electronic search engine 244a, an enterprise network 246a, a home computing, multimedia and communications network 248a, a doctor's office 250a and a financial institution 252a. These resources may comprise computing platforms, storage facilities, and networks as well as personal accounts and subscribed services that may provide information or perform information processing for a user who may be nearby or located remotely.

The connecting network 216 may comprise one or more of a wide area network (WAN), a metropolitan area network (MAN), the Internet, and an intranet for example.

The network 200a may be enabled to be configured as a personal virtual network for managing information among personalized and shared resources. The network 200a may comprise personalized resources and local resources. Resources within the personal domain 203a may share information with resources in the local domain 203a via the internet 216 and/or other public and private networks.

The personal domain 203a may comprise resources that may be configured along with resources in the local domain 201a to form a personal virtual network. Resources in the personal domain 203a may comprise for example personally managed electronic equipment, processes and/or information. In addition, personal domain resources may comprise a subscribed service or an account identified with a user for example. Moreover a personal domain resource may be a publicly available resource that a user has identified as a preferred source of information or processing. Thus, resources shared by a plurality of users, may be personalized for a particular user by identifying the resource as a preferred source within a personal virtual network.

The personal domain 203a may comprise government agencies comprising personal or public records 240a, subscribed electronic services such as film, video and or music 242a, archival services such as libraries, museums or electronic search engines 244a, personal work accounts such as on an enterprise network 246a, a home computing, multimedia and communications network 248a, a doctor's office with personal medical history 250a and a financial institution with personal financial records 252a. Resources within the personal domain may be communicatively coupled with resources in the local domain. Any other resources with suitable information and facilities may be utilized in the personal domain.

Resources in the local domain 201a may vary in time depending on location of the personal handheld or portable wireless communication device (HWCD) 202. Local resources may be for example electronic equipment, processes and/or information that engage temporarily within a personal virtual network and that may be configured or coordinated utilizing the HWCD 202. For example, a user located remotely from a personally owned video monitor, may utilize the HWCD 202 to configure a network connection between a personal domain resource comprising desired video content and a locally available resource comprising a networked video monitor. For example, the user may be located at a friend's home 218a and wish to retrieve and render video content from their home network 248a. The user may utilize their personal HWCD 202 to configure an ad hoc personal network via the internet 216 and transfer video streams to the local network.

In addition, a resource within a user's personal domain 203a may be utilized as a local resource. For example, a user may control the transfer of information from a video downloading service 242a to a personal computer within their home network 248a utilizing their HWCD 202. The HWCD 202 may be utilized to configure an ad hoc network from one device to another and control transfer of data. Moreover, the HWCD 202 could be utilized to transfer data from one device to another within the user's home 248a.

The local domain 201a may comprise a personalized handheld wireless communication device (HWCD) 202. For example, the HWCD 202 may be a portable wireless phone, a wireless personal digital assistant (PDA), a wireless content rendering device, a portable computer with radio capability or another portable device. The HWCD 202 may comprise suitable circuitry, logic and/or code to configure a personal virtual network for routing and processing information between resources in the personal domain 203a and local domain 201a. The HWCD 202 may enable processing and/or displaying information by performing tasks itself or assigning tasks to local or personal domain resources. In addition, the HWCD 202 may be enabled to function as a thin client handling user input and screen display while associated processing may be performed by resources in the personal domain 203a or local domain 201a.

The personal HWCD 202 may comprise suitable logic, circuitry and/or code to enable secure communication among personal and local resources utilizing a plurality of security mechanisms. The personal HWCD 202 may manage encryption and decryption processes among resources that may utilize encryption keys, message authentication code and/or digital signatures for example. The personal HWCD 202 and/or the user of an HWCD 202 may be subject to authentication processes when accessing personal resources. In addition, the personal HWCD 202 may be enabled to gain temporary or long term access privileges for use of resources in the public domain. In this regard, the HWCD 202 may be enabled to perform security tasks itself or may assign one or more of the tasks to available resources within either the personal or local domain.

The HWCD 202 may comprise suitable logic circuitry and or code to enable information format compatibility between personal and local resources by utilizing trans-coding or format conversion for example. For example, for incompatible rates, the HWCD 202 may perform trans-rating to lower or raise a bit rate, or it may modify the format of a stream or file. In this regard, the HWCD 202 may perform compatibility tasks itself. Alternatively, the HWCD 202 may assign the tasks to available resources within the personal or local domains that may have ample computing and storage capacity to decode, decompress, encode or otherwise modify information.

In an exemplary embodiment of the invention, a user may wish to retrieve an image file stored in a memory on a home computer within the user's personal domain 203a, and display the image on a HWCD 202 at a remote location. In this regard, the home computer may store the image file as a high resolution JPEG image at 3000×2000 pixels with 10 bits of color per component, for example, which may not be compatible with display capabilities in the HWCD 202. The HWCD 202 may configure a personal virtual network from the remote location and assign the home computer within the user's personal domain 203a, a task of performing trans-coding on the image file prior to sending it to the HWCD 202. The home computer within the user's personal domain 203a may transcode the content to a lower resolution image with less color, for example 640×480 pixels and 18 bits of color, that may be compatible with the HWCD 202's capabilities and may send it via the personal virtual network to the HWCD 202 for display.

The HWCD 202 may support a plurality of protocols, information formats and computer languages. In addition, the HWCD 202 may support a computer language that is supported by all resources within the personal and local domains.

In another embodiment of the invention, the HWCD 202 may assign a processing task to one or more of the resources within the local domain resources 201a. For example, a task of converting video and/or audio into a format that is compatible with one or more rendering devices within the local domain resources 201a, may be assigned to a local resource within the local domain resources 201a. In this regard, interlaced video with 1920×1080 resolution and 60 fields/second may be received by the local resource at 18 Mbps and may be converted to progressive video with 480×272 resolution and 30 frames per second. The converted video may be communicated from the local resource to the local rendering device at 500 kbps for example.

The HWCD 202 may receive commands and input information via digital keying operation, from voice input via a microphone and/or any other suitable interface capable of receiving information from a user. The HWCD 202 may have a biometric scanner or other device that ma be enabled to identify a particular user by fingerprint, heart beat and/or retina, for example. The HWCD 202 may output information and alerts to a user via a plurality of technologies. For example, text and/or image may be displayed, audible messages may utilize text to speech (TTS) technology or tones transmitted via a speaker or any other suitable indicator of information may be utilized.

Functionality pertaining to setting up personal preferences, configuring a personal network and accessing, modifying and/or transferring personalized information via an HWCD 202, may be need to be protected by security operations and coordinated between the HWCD 202 and resources within the personal domain 203a. For example, password protection or biometric scanning may be utilized to validate a user and grant access to secure functionality within the HWCD 202. In addition, the HWCD 202 and/or the user may need to be authenticated by personal domain resources 203a prior to releasing personal information.

The one or more wireless links 214, may comprise WLAN, Bluetooth, cellular, satellite, or any other suitable wireless technology. The wireless links 214 may be communicatively coupled with the internet via public or private wire line and/or other wireless networks.

A plurality of local domain entities may comprise resources for communicating, processing and rendering information. For example, block 210a may comprise a location for medical services such as a hospital, pharmacy and or ambulance, block 212a may comprise a mobile location such as a car or airplane, block 216a may comprise a location for leisure and/or recreation such as a hotel, block 218a may comprise a home of friends or family, block 220a may comprise a location for financial transactions such as a shopping center, block 222a may comprise a place for personal study such as a school 222a. Other locations visited by the user and/or HWCD 202 comprising suitable resources may be utilized.

In operation, a valid user may define a personal domain 203a by indicating personal preferences and personalized resources for a personal portable HWCD 202. The user may utilize the HWCD 202 in a plurality of locations within local domain 201a that may offer networking, processing and rendering resources for example. The user may gain access to secure functionality via password or biometric security operations. The user may configure a personal virtual network comprising personal domain resources as well as local resources utilizing the personal portable HWCD 202. The user may be validated and allowed to access, process and render information within their personal virtual network.

Figure 2B:
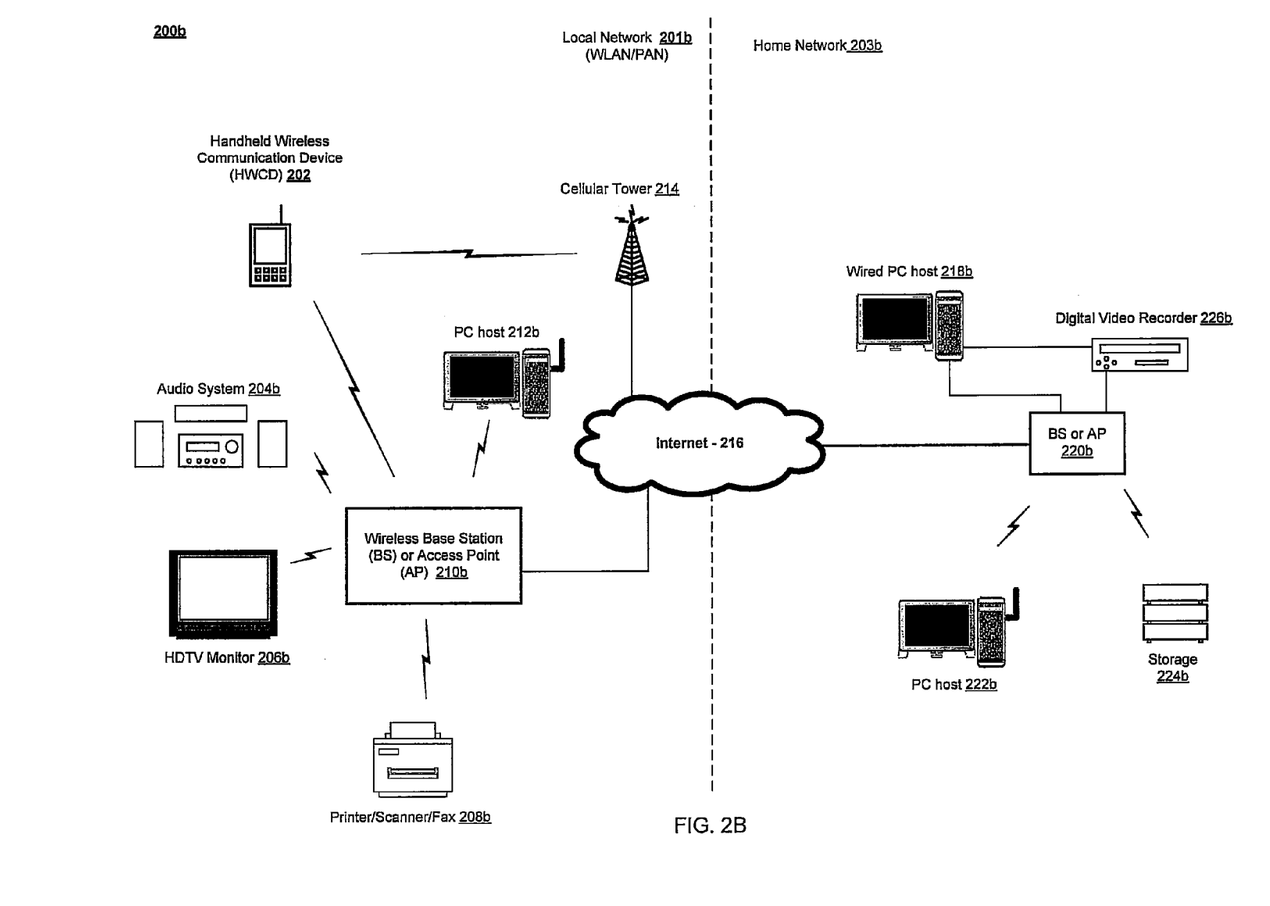
FIG. 2B is a block diagram illustrating a network connection configured by a handheld wireless communication device, in accordance with an embodiment of the invention.

FIG. 2B is a block diagram illustrating a network connection configured by a mobile wireless communication device, in accordance with an embodiment of the invention. Referring to FIG. 2B, there is shown a network infrastructure 200b comprising a local network 201b and a personal home network 203b. The local network 201b may communicate with the personal home network 203b via the Internet 216 for example. The local network 201b may comprise a personalized handheld wireless communication device (HWCD) 202, an audio system 204b, an HDTV monitor 206b, a printer/scanner/fax 208b and a wireless base station or access point 210b The home network 203b may comprise a wired host PC 218b, a PC host 222b, a storage device 224b, a wireless base station or access point 220b and a digital video recorder (DVR) 226b. The devices coupled to the local network 201b and the personal home network 203b may be communicatively coupled to their respective base station or access point 210b and 220b via a wireless connection utilizing one of a plurality of protocols, such as Bluetooth, Wi-Fi, or wireless LAN 802.11 for example. The number of devices is not limited to the number shown in FIG. 2. Accordingly, any suitable number of networked multimedia devices may be utilized.

The HWCD 202 may comprise a device capable of communicating wirelessly utilizing a plurality of methods and/or protocols and over a plurality of networks. The HWCD 202 may function as a cellular phone, personal data assistant, and/or a handheld computing device, for example. In addition, the HWCD 202 may function as a router, in that it may configure itself to use and connect to local and remote resources to perform multi-media and communication tasks by auto discovery of local devices and capabilities via standardized protocols.

In operation, devices local to the handheld device may announce their capabilities and availability in instances when the HWCD 202 comes in range of them and discovers the wired or wireless network that links them. In another embodiment of the invention, the HWCD 202 may poll for available networks and resources. In this manner, the hand held device may maintain a list of local resources that it may communicate with along with their capabilities.

The HWCD 202 may keep information about resources available on its home network 203b and may update that information as well as information regarding bandwidth capabilities of its connection to the home network 203b via locally available networks. In instances when the user of the handheld device 202 may wish to accomplish a certain multimedia or communications task, the HWCD 202 may be utilized to configure the local and remote resources in order to accomplish the multimedia or communications task.

In one embodiment of the invention, resources within the home network 203b may comprise a powerful PC, such as the wired PC host 218b, with large amounts of storage and computing resources, including trans-coding capabilities and local digital video storage. In addition, the HWCD 202 may be connected to a wireless network that includes an HDTV monitor 206b that may be available for use and may have high bandwidth connectivity via the Internet to the home network 203b. The HWCD 202 may create an ad hoc virtual network of devices from the home network 203b to the local network 201b. For example, the HWCD 202 may be enabled to configure a route for data streaming from a home video storage device, such as the DVR 226b, to the wired PC host 218b wherein data may be transcoded to a different display format. The data may be communicated over the Internet 216 to the local network 201b and to the local HDTV monitor 206b for display. The HWCD 202 may also configure the ad hoc virtual network and the audio system 204b to play audio that corresponds to the video playing on the HDTV monitor 206b.

The ad hoc network and linking of resources described above may be made possible by the HWCD 202 creating and updating its list of local and remote resources whenever network locality changes. The discovery of local resources could be made by listening and logging announcement messages that detail resources and their capabilities or by querying new local networks for available resources. One or both of these functions may be accomplished with standardized protocols.

In an exemplary aspect of the invention, the HWCD 202 may be within range of a WLAN, such as the local network 201b. The HWCD 202 user may wish to stream video to the HDTV monitor 206b and audio for the video on the audio system 204b, both from a data source, such as the storage 224b, or the DVR 226b, on the home network 203b, for example. The HWCD 202 may determine whether the local network 201b WLAN, may be in its list of accessible networks. The HWCD 202 may also have stored usernames, passwords and wireless protocols, for example, for the local network 201b. In instances when the HWCD 202 may not have the local network 201b in its stored database of networks and resources, the HWCD 202 may receive information that the local network 201b may broadcast, such as the network system ID, which may comprise information about the wireless protocol, speed and access rights, for example.

The HWCD 202 may establish a route from the HWCD 202, through the BS or AP 210b, through the Internet 216, to the BS or AP 220b, to the storage 224b and/or DVR 226b, and back to the local network 201b, the HDTV monitor 206b and the audio system 204b. The HWCD 202 may determine that the format of the video stored on the storage 224b and/or the DVR 226b may not be appropriate for the HDTV monitor 206b. In this instance, the HWCD 202 may direct the data through the PC host 218b, which may transcode the video file to a suitable format to be played on the HDTV monitor 206b for example.

The HWCD 202 may have stored information on the available resources in the local network 201b and the home network 203b, or if not, may poll or discover the network for resources and their characteristics. In this manner, the stored network and resource data may be continuously updated. In addition to storing lists of networks and resources available, the HWCD 202 may also store preferences, such as the type of networks the user may have access to, and the preferred protocol to utilize if a plurality of protocols may be available, for example. In instances where the HWCD 202 may be utilizing a cellular network, such as the cellular tower 214, and the HWCD 202 moves into an area where a WLAN may be available, such as through the BS or AP 210b, and the HWCD 202 stored preferences indicate the WLAN is preferred over the cellular network, the HWCD 202 may switch over to the WLAN.

The HWCD 202 may build the ad hoc network based on the user's request for a particular function and the availability of resources. For example, there may be multiple display devices available in a local network, such as the small screen on the HWCD 202 and a larger networked display, such as the HDTV monitor 206b. The HWCD 202 may pick the best means of displaying the content based on the bandwidth of the various heterogeneous networks that may be traversed, the requirement and availability of transcoding resources, and the battery power available on the handheld device 202. In instances where there may be sufficient battery and CPU resources available in the HWCD 202, the HWCD 202 may choose to perform the transcoding functions locally. Or if trans-coding may not be available, the HWCD 202 may display the content on a display appropriate for that content.

Figure 3:
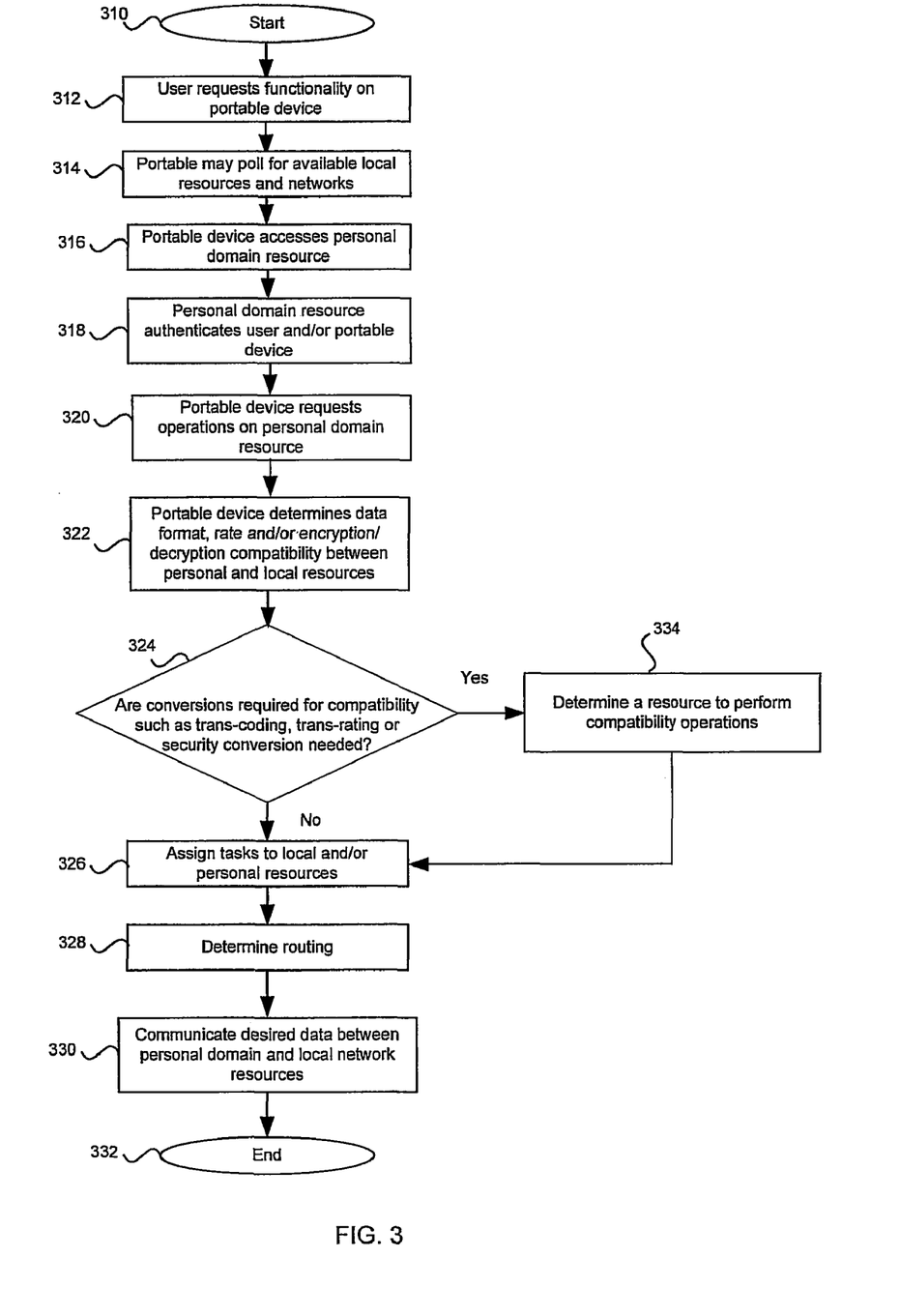
FIG. 3 is a flow diagram illustrating exemplary steps for configuring a personal virtual network and communicating information according to user preferences, in accordance with an embodiment of the invention.

FIG. 3 is a flow diagram illustrating exemplary steps for managing information within a personal virtual network comprising personal and shared resources utilizing a personal portable or handheld wireless communication device (HWCD), in accordance with an embodiment of the invention. Referring to FIG. 3, in step 312 following start step 310, a user may request a particular function via a HWCD 202. In step 314, the HWCD 202 may search for an available network or networks and discover the availability of local resources and their capabilities associated with the requested function. In step 316, the HWCD 202 may access one or more resources in its personal domain of resources 203a shown in FIG. 2A. In step 318, one or more resources within the personal domain 203a may authenticate the HWCD 202 and/or the user of the HWCD 202.

In step 320, the HWCD 202 may request operations on a personal domain device. For example, the HWCD 202 may request transferring of a digital media file from a user's video distribution service subscription 242a in FIG. 2A. In step 322, the HWCD 202 may compare formatting of the information from a source with a target resource's format handling capabilities. In step 324 the HWCD 202 may determine whether information format conversions are needed. In step 326, the HWCD 202 may assign tasks to itself, or external resources which may comprise available resources in the personal domain and/or resources in the local domain. In step 328, the HWCD 202 may determine routing for the requested information and processes. In step 330, the information may be processed and communicated to a target device and processed according to the original request. Step 332 is an end step. In step 324, if the HWCD 202 determines that information may need to be adapted to conform to a target resource's format processing capabilities, the flow may proceed to step 334. In step 334, the HWCD may determine which resources may perform conversion processes for example trans-coding, trans-rating and security operations adaptation. The process may proceed to step 326.

In an embodiment of the invention, a portable wireless communication device 202 may be enabled for discovering available networks and resources. The resources may be local 201a or remote 203a as shown in FIG. 2A. The portable wireless communication device 202 may utilize user preferences to select one or more of the available resources and establish a route to them and/or among them. The user preferences may be dynamically adjusted. The portable wireless communication device 202 may exchange information with one or more of the selected available resources and/or direct communication of information between one or more of the selected available resources via the established route.

The portable wireless communication device 202 may process the information or assign one or more of the selected available resources to process the information. The portable wireless communication device 202 may undergo authentication processing for itself and/or for its user. It may enable securing the information prior to communication to a target resource. The portable wireless communication device 202 may enable format conversion of the information, to a format compatible with the target resource. A plurality of wireless communication protocols may be utilized.

In response to a request from a user made via a portable or handheld wireless communication device (HWCD) 202 to process data, the HWCD 202 may discover one or more networked resources in home network 203b that are capable of handling the processing. In addition, one or more communication routes may be established between the one or more discovered network resources in home network 203b capable of processing the data and one or more of the HWCD 202 and a networked terminating device in local network 201b. In this regard, the portable HWCD 202 may be configured as a gateway.

The user's identity may be determined and the user's personal networking preferences may be acquired. Based on the user's preferences, a route may be established between one or more of the discovered networked resources within home network 203b and one or more of the HWCD 202 and the networked terminating device within local network 201b. In addition, the user's identity may be authenticated.

The requested data may be converted to a data rate or data format compatible with the HWCD 202 and/or the networked terminating device. Communication of the data between the HWCD 202, the one or more networked resources in home network 203b and/or the networked terminating device in local network 201b may be protected by secure operations. One or more of the HWCD 202 and the networked terminating device in local network 201b may consume or render the requested data.

Certain embodiments of the invention may comprise a machine-readable storage having stored thereon, a computer program having at least one code section for managing information among personalized and shared resources with a personalized portable device, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for communicating information, the method comprising:

in response to receiving a user request by a portable handheld wireless communication device (HWCD) to handle processing of data for consumption of content, discovering and configuring via said portable HWCD, a personalized ad hoc network comprising one or more networked resources for said handling of said requested processing of said data, wherein at least one of said networked resources is located remotely with respect to said portable HWCD; and establishing via said portable HWCD, one or more communication routes between said discovered and configured one or more networked resources and said portable HWCD, a networked terminating device, or a combination of said HWCD and said networked terminating device, for enabling said handling of said requested processing of said data.

2. The method according to claim 1, comprising configuring said portable HWCD as a gateway.

3. The method according to claim 1, comprising determining an identity of a user initiating said user request.

4. The method according to claim 3, comprising acquiring a preference for said user based on said determined identity of said user initiating said user request.

5. The method according to claim 4, comprising establishing said one or more communication routes between said discovered one or more networked resources based on said acquired user preference.

6. The method according to claim 3, comprising authenticating said determined identity of said user initiating said request.

7. The method according to claim 1, comprising consuming said data by said portable HWCD, said networked terminating device, or said portable HWCD and said networked terminating device.

8. The method according to claim 1, comprising converting data from said one or more networked resources to a format compatible with said portable HWCD, said networked terminating device, or said portable HWCD and said networked terminating device.

9. The method according to claim 1, comprising converting a data rate of data from said one or more networked resources to a data rate that is compatible with said portable HWCD, said networked terminating device, or said portable HWCD and said networked terminating device.

10. The method according to claim 1, comprising securing communication between said portable HWCD, said one or more networked resources, said networked terminating device, or any combination thereof.

11. A non-transitory machine-readable storage having stored thereon, a computer program having at least one code section for communicating information, the at least one code section being executable by a machine for causing the machine to:

in response to receiving a user request by a portable handheld wireless communication device (HWCD) to handle processing of data for consumption of content, discover and configure via said portable HWCD, a personalized ad hoc network comprising one or more networked resources for said handling of said requested processing of said data, wherein at least one of said networked resources is located remotely with respect to said portable HWCD; and establish via said portable HWCD, one or more communication routes between said discovered and configured one or more networked resources and said portable HWCD, a networked terminating device, or said portable HWCD and said networked terminating device, for enabling said handling of said requested processing of said data.

12. The non-transitory machine-readable storage according to claim 11, wherein said at least one code section comprises code for configuring said portable HWCD as a gateway.

13. The non-transitory machine-readable storage according to claim 11, wherein said at least one code section comprises code for determining an identity of a user initiating said user request.

14. The non-transitory machine-readable storage according to claim 13, wherein said at least one code section comprises code for acquiring a preference for said user based on said determined identity of said user initiating said user request.

15. The non-transitory machine-readable storage according to claim 14, wherein said at least one code section comprises code for establishing said one or more communication routes between said discovered one or more networked resources based on said acquired user preference.

16. The non-transitory machine-readable storage according to claim 13, wherein said at least one code section comprises code for authenticating said determined identity of said user initiating said request.

17. The non-transitory machine-readable storage according to claim 11, wherein said at least one code section comprises code for consuming said data by said portable HWCD, said networked terminating device, or said portable HWCD and said networked terminating device.

18. The non-transitory machine-readable storage according to claim 11, wherein said at least one code section comprises code for converting data from said one or more networked resources to a format compatible with said portable HWCD, said networked terminating device, or said portable HWCD and said networked terminating device.

19. The non-transitory machine-readable storage according to claim 11, wherein said at least one code section comprises code for converting a data rate of data from said one or more networked resources to a data rate that is compatible with said portable HWCD, said networked terminating device, or said portable HWCD and said networked terminating device.

20. The non-transitory machine-readable storage according to claim 11, wherein said at least one code section comprises code for securing communication between said portable HWCD, said one or more networked resources, said networked terminating device, or any combination thereof.

21. A system for communicating information, the system comprising:

a portable handheld wireless communication device (HWCD) comprising one or more processors, which in response to receiving a user request to handle processing of data for consumption of content, said one or more processors is configured to discover and configure a personalized ad hoc network comprising one or more networked resources for said handling of said requested processing of said data, wherein at least one of said networked resources is located remotely with respect to said HWCD;

said one or more processors is configured to establish one or more communication routes between said discovered and configured one or more networked resources and said portable HWCD, a networked terminating device, or said portable HWCD and said networked terminating device, for enabling said handling of said requested processing of said data; and said one or more processors is configured to assign different processing tasks to said discovered and configured one or more networked resources and said portable HWCD, said networked terminating device, or said portable HWCD and said networked terminating device, for processing said data.

22. The system according to claim 21, wherein said one or more processors configures said portable HWCD as a gateway.

23. The system according to claim 21, wherein said one or more processors determines an identity of a user initiating said user request.

24. The system according to claim 23, wherein said one or more processors acquires a preference for said user based on said determined identity of said user initiating said user request.

25. The system according to claim 24, wherein said one or more processors establishes said one or more communication routes between said discovered one or more networked resources based on said acquired user preference.

26. The system according to claim 23, wherein said one or more processors authenticates said determined identity of said user initiating said request.

27. The system according to claim 21, wherein said one or more processors consumes said data by said portable HWCD, said networked terminating device, or said portable HWCD and said networked terminating device.

28. The system according to claim 21, wherein said one or more processors enables conversion of data from said one or more networked resources to a format compatible with said portable HWCD, said networked terminating device, or said portable HWCD and said networked terminating device.

29. The system according to claim 21, wherein said one or more processors enables conversion of a data rate of data from said one or more networked resources to a data rate that is compatible with said portable HWCD, said networked terminating device, or said portable HWCD and said networked terminating device.

30. The system according to claim 21, wherein said one or more processors enables securing communication between said portable HWCD, said one or more networked resources, said networked terminating device, or any combination thereof.

* * * * *